United States Patent Office 3,525,956
Patented Aug. 25, 1970

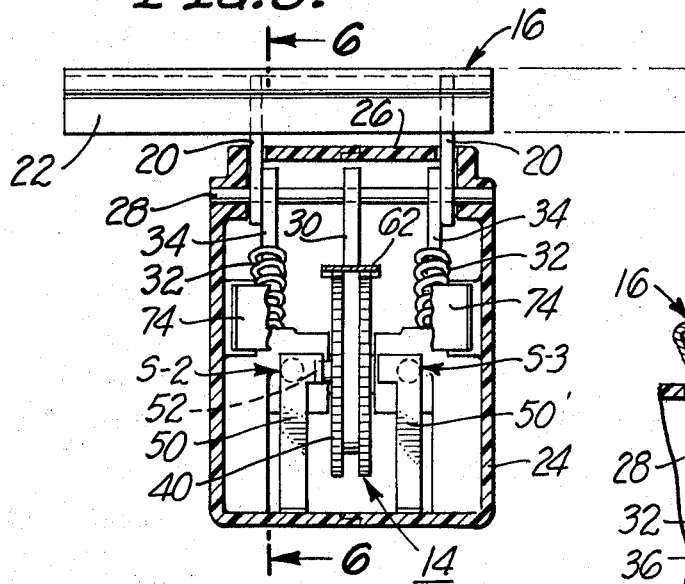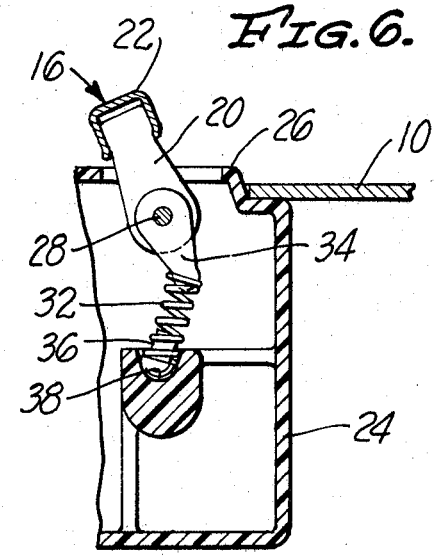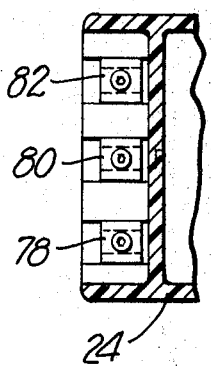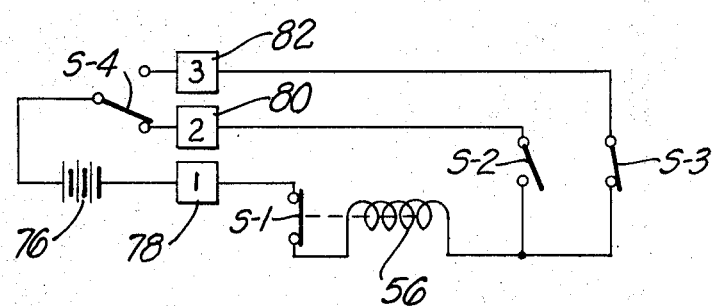

3,525,956
CONTROL APPARATUS FOR ELECTRICAL
CIRCUIT BREAKER
William M. Poschman II, 1409 Dogwood,
North Las Vegas, Nev. 89030
Filed Sept. 9, 1968, Ser. No. 758,229
Int. Cl. H01h 51/08
U.S. Cl. 335—74                                    13 Claims

ABSTRACT OF THE DISCLOSURE

Control apparatus for an electrical switch particularly adapted for use in an electrical distribution box alongside of or adjacent the end of conventional electrical circuit breaker units, including a control wheel rotatably mounted in a housing and connected through a cam and control arm to an activating arm of an electrical switch, drive means for rotating the control wheel, circuit means for energizing the drive means, and stop means for de-energizing the drive means when the activating arm of the electrical switch has moved from one position to another. An external switch member is provided as part of the circuit means to activate the drive means and initiate rotation of the control wheel.

---

The present invention relates generally to control apparatus for electrical switches and for opening and closing an electrical circuit and, more particularly, to control apparatus adapted for use in an electrical distribution box in combination with adjacent conventional electrical circuit breaker units. Operation of a remote switch member serves to control position of the activating arm of one or more such circuit breakers, thereby facilitating both installation and operation of the control apparatus and the circuit breakers.

Electrical distribution boxes are usually installed in a wall or the like and are typically designed to hold one or more vertical rows of individual circuit breaker units each having a switch activating arm capable of manual operation in a generally horizontal direction between "on" and "off" positions. Various individual electrical circuits are normally connected in series with their associated circuit breakers such that putting the activating arms in the "on" and "off" positions respectively closes and opens the associated circuits. Accordingly, it is a primary object of the present invention to provide a control apparatus which includes means for remotely controlling the position of one or more of such activating arms of an electrical circuit breaker.

Whenever there is an overload in any of the circuits, conventional circuit breakers are designed to automatically open the circuit involved by tripping the associated circuit breaker to the "off" position. Accordingly, it is another object of the present invention to provide a control apparatus which includes means for reactivating the formerly overloaded circuit by operation of a switch conveniently located away from the electrical distribution box, thereby avoiding any delay and inconvenience which would otherwise occur if the circuit had to be reactivated manually at the electrical distribution box itself.

Referring to the usual design of electrical distribution boxes as previously described, it is particularly desirable to have control apparatus which can be removably installed either adjacent the side of the end of standard circuit breaker units. Flexibility is further enhanced if the control apparatus housing has dimensions and shape similar to the casing used for the circuit breaker units. It is therefore another object of the present invention to provide control apparatus for electrical circuit breakers which is sized and shaped for removable installation in a conventional electrical distribution box adjacent standard circuit breaker units and taking up the same amount of space required for one or more of such units. A related object is to provide means for interconnecting the control apparatus with the activating arms of the adjacent circuit breaker units.

More specifically, it is an object of the invention to provide a control apparatus for an electrical switch which includes a control wheel rotatably mounted in a housing and connected through a cam and a control arm to an activating arm of the switch, drive means for rotating the control wheel, circuit means for energizing the drive means, and stop means for de-energizing the drive means when the activating arm of the electrical switch has moved from a first position to a second position.

A further object is to provide apparatus of the foregoing character which includes an external switch member for activating the drive means and initiating rotation of the control wheel.

The foregoing objects, advantages, features and results of the invention, together with various other objects, advantages, features, and results thereof which will be evident to those skilled in this art in the light of the present disclosure, may be achieved with the exemplary embodiment of the invention described in detail hereinafter and illustrated in the accompanying drawings.

In the drawings:

FIG. 5 is a sectional view taken along line 5—5 in FIG. 3;

FIG. 6 is a sectional view taken along line 6—6 in FIG. 5 showing the details of a spring restraint on the control arm;

FIG. 7 is a sectional view taken along line 7—7 in FIG. 3 showing the three outside terminals of the control apparatus; and FIG. 8 is a schematic circuit diagram showing the switch settings after the control arm has been moved to the first position.

Figure 1:
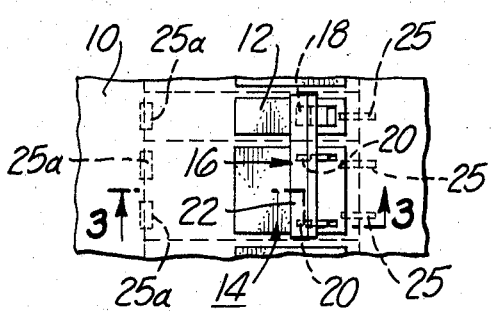
FIG. 1 is a front elevational view of a portion of an electrical distribution box showing a control apparatus mounted adjacent the side of a single circuit breaker unit.
Figure 2:
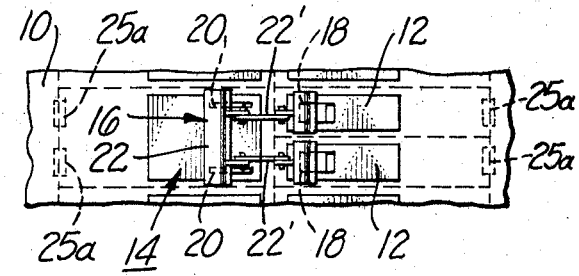
FIG. 2 is a similar front elevational view showing an alternative embodiment in which a control apparatus is mounted adjacent the ends of two circuit breaker units.

Generaly speaking, the apparatus to be described includes a conventional electrical distribution box 10 having a plurality of holding means for mounting conventional circuit breaker units, a circuit breaker unit 12 mounted in one of the holding means, and control apparatus 14 mounted in another of said holding means adjacent the circuit breaker unit. The details of such an electrical distribution box and typical holding means therein are well known in the art, two examples being the types disclosed in U.S. Pats. Nos. 2,530,548 and 3,290,457, respectively. In the preferred embodiment of the invention, the control apparatus 14 is mounted adjacent the side of the circuit breaker 12 as shown in FIG. 1. In an alternative embodiment such as shown in FIG. 2, the control apparatus 14 is mounted adjacent the end of two circuit breaker units 12. In both embodiments, rigid means 16 is provided for connecting one or more activating arms 18 of the circuit breaker units 12 with a two-pronged control arm 20 of the control apparatus 14. In the preferred embodiment of FIG. 1, rigid means is shown as a long connecting bar 22 adapted to fit over and attach to a two-pronged control arm 20 and the activating arm 18. Any change of position of the control arm 20 therefore effects a corresponding change of position of the activating arm 18 attached to the connecting bar 22 as well as any other activating arms which may be so connected. The alternative embodiment of FIG. 2 shows a pair of connecting bars 22′ which serves the same purpose as connecting bar 22. However, the invention is not limited to such connecting bars, but includes any rigid means adapted to connect the control arm 20 with one or more activating arms 18.

It is an important feature of the invention to provide a control apparatus 14 which can be removably mounted in any of the holding means in the electrical distribution box. In this regard the control apparatus 14 includes a housing 24 which is as wide as two conventional circuit breaker units and which otherwise has dimensions and shape substantially the same as the dimensions and shape of one or more conventional circuit breaker units. A preferred electrical distribution box 10 is disclosed in U.S. Pat. No. 3,054,025 and includes a plurality of electrical buses with upstanding stabs 25 in spaced relation. Each of the electrical circuit breaker units 12 carries bus clips (not shown) which are sized to telescope over and frictionally engage stabs 25. It will be noted from FIGS. 1 and 3 that only a portion of each stab 25 adjacent one edge thereof is thus engaged by a unit.

Figure 3:
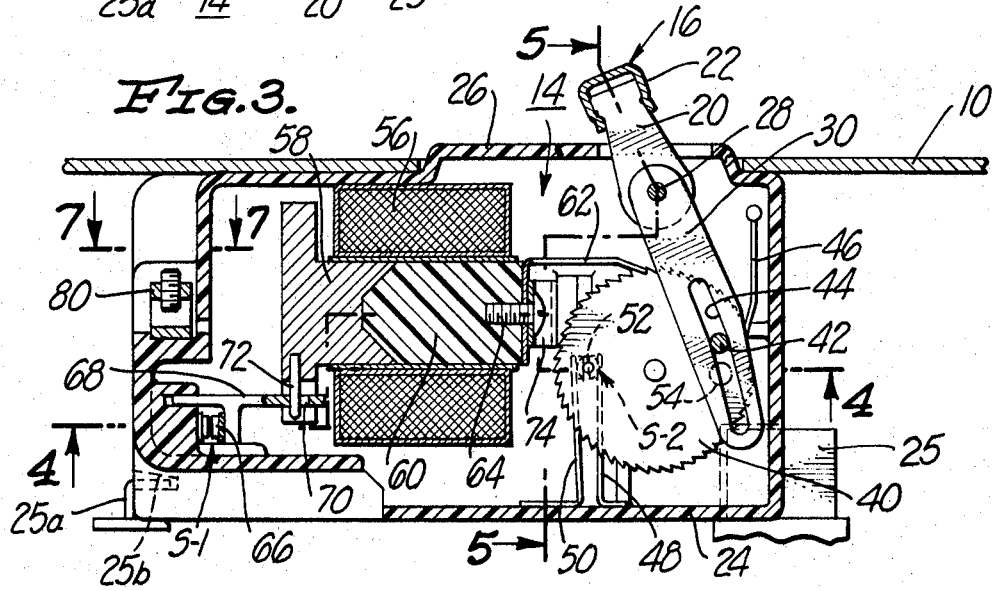
FIG. 3 is a sectional view taken along line 3—3 in FIG. 1 showing a control arm in a first position with switch S-2 open.

The stabs 25 form parts of the holding means for the individual circuit breaker units 12. The remaining parts of the holding means comprising hooks 25a facing corresponding stabs 25 for insertion into complementary recesses 25b in the ends of the circuit breaker housings. FIGS. 1 and 3 illustrate how the same stabs 25 and clips 25a are used to removably mount the housing 24 in a similar manner. However, since the exemplary form of the control apparatus is twice as wide as the illustrated circuit breaker units 12, the housing 24 may include two bus clips and two hook-receiving recesses 25b for engagement with the corresponding stabs 25 and hooks 25a. As will appear hereinafter, the bus clips in the housing 24 are not electrically connected to anything since the control apparatus 14 draws no current from the bus. It should be realized, however, that the invention is not limited to use in an electrical distribution box as hereinbefore described, but that the control apparatus 14 may be used to control any electrical switch having an activating arm.

Figure 4:
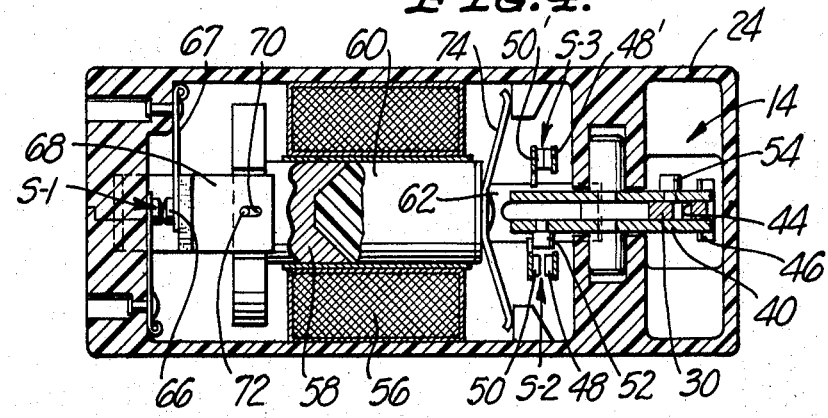
FIG. 4 is a sectional view taken along line 4—4 in FIG. 3.

Referring more specifically to the control apparatus 14 as shown in FIGS. 3, 4, and 5, the housing 24 includes a raised portion 26 having two apertures therein to allow the two-pronged control arm 20, which is pivotally mounted on a pivot rod 28 within the housing, to extend therefrom for attachment to the connecting bar 22 as previously described. The pivot rod 28 has its ends journaled in the housing 24 and carries in its center portion a cam 30. The upper end of the cam is fixedly attached to the pivot rod 28 such that any pivotal movement of the cam causes similar pivotal movement of the control arm 20 and the connecting bar 22 attached thereto.

The control apparatus 14 is particularly designed for use in controlling the activating arm 18 between an "off" position and an "on" position. Such control is particularly important in connection with conventional circuit breaker units having a switch connected in series with an associated electrical circuit. In this regard the control arm 20 is designed to move from a clearly defined first position to a clearly defined second position and vice versa. To this end restraining springs 32 are attached to the pivot rod 28 by spring brackets 34. The lower end of each spring 32 encircles a pin 36 having its head mounted in a seat 38 shaped for receiving the head, the seat being part of the housing. The springs 32, as shown in FIG. 6, are attached to their associated spring brackets 34 to provide an override force acting on the control arm 20. Referring to FIGS. 3 and 6, when the control arm 20 is to the left of center, the springs 32 urge the control arm toward a first position such as the position shown. Alternatively, the springs 32 urge the control arm 20 toward its second position whenever the control arm is to the right of center.

In order to control the pivotal movement of the cam 30, a control wheel such as a ratchet wheel 40 is rotatably mounted in the housing 24. The illustrated ratchet wheel 40 includes two identical circular ratchets concentrically mounted on a hub and carries an actuating pin 42 which extends from the wheel and is adapted to fit in an elongated slot 44 located in the lower end of the cam 30. A check pawl 46 engages the teeth of the ratchet wheel 40 to restrict the movement of the wheel to one direction only. A drive means to be described hereinafter causes unidirectional rotation of the ratchet wheel 40 and the actuating pin 42 extending therefrom. During such rotation, the actuating pin 42 moves back and forth along the elongated slot 44 of the cam 30 to impart pivotal motion to the cam and the control arm 20. The actuating pin 42 and the elongated slot 44 are designed to allow the control arm 20 to move freely from one position to the other causing rotation of the ratchet wheel 40 without the wheel being driven by the drive means. Such movement might occur, for example, when the activating arm 18 of the circuit breaker unit 12 is automatically turned off due to an overload of its associated circuit.

Rotation of the ratchet wheel 40 also serves to periodically open switches S–2 and S–3 which are normally closed. In this regard, switches S–2 and S–3 are mounted in the housing 24 on opposite sides of the ratchet wheel 40 and include similar fixed contacts 48, 48′ and similar movable contacts 50, 50′, respectively, as best shown in FIG. 4. A finger member such as a switch dog 52 is mounted on one side of the ratchet wheel 40 for engagement with the movable contact 50 of switch S–2. A similar finger member such as switch dog 54 is mounted on the other side of the ratchet wheel 40 and 180° removed from the switch dog 52 for engaging the movable contact 50′ of the switch S–3. FIGS. 3 and 4 show the ratchet wheel 40 positioned such that switch dog 52 is engaging the movable contact 50 of switch S–2 to hold the switch in an open position. It will be appreciated that initial rotation of the ratchet wheel 40 will cause disengagement of switch S–2 by the switch dog 52 allowing switch S–2 to return to its normally closed position, and that continued rotation of the ratchet wheel through 180° will bring switch dog 54 into engagement with movable contact 50′ of switch S–3 to open the switch.

With regard to drive means for rotating the ratchet wheel 40, magnetic means is mounted in the housing 24 for actuating the ratchet wheel, the exemplary form of magnetic means including a solenoid 56 and a core 58, such as a soft iron slug, sized to at least partially fit within the solenoid. The core 58 is positioned on the left end of the solenoid 56 as shown in FIG. 3 so that when the solenoid is energized, the core is drawn into the solenoid in a forward direction. The core 58 is coupled to the ratchet wheel 40 through a non-metallic filler core 60 connected to the core 58 at one end and to a pawl member 62 mounted on the other end by a screw 64. In the illustrated form, the pawl 62 extends forwardly from the filler core 60 to engage an outer portion of the ratchet wheel 40. Therefore, any forward movement of the core 58 is transferred through the pawl 62 to the ratchet wheel 40 and causes the ratchet wheel to rotate, as previously described.

The drive means includes in addition to the magnetic means just described, cut-off means for intermittently de-energizing the magnetic means during rotation of the ratchet wheel 40 to allow the pawl member 62 to repeatedly disengage the ratchet wheel and re-engage it at different locations on its perimeter. In the preferred embodiment (see FIGS. 3 and 4) the cut-off means is exemplified by a normally closed switch S–1 and various structural elements related thereto. In that regard, switch S–1 is located in the housing 24 and has a movable switch contact 66 mounted on an end of a spring arm 67 which is attached at its other end to the housing 24 for urging the movable switch contact 66 open. The spring arm 67 abuts a transverse portion of a slide member 68 which has an oblong hole 70 sized to receive a pin 72 attached to the core 58. When the solenoid 56 is de-energized, the pin 72 slides to the rear of the oblong hole 70 to exert rearward pressure against the slide member 68, thereby counteracting spring arm 67 to keep switch S–1 closed. The rearward pressure is provided by a leaf spring 74, attached near its center to the forward end of the filler core 60 and having its center to the forward end of the filler core 60 and having its ends forwardly abutting the housing 24, as shown in FIG. 4.

The foregoing design allows the energized solenoid 56 to overcome the rearward spring force of the leaf spring 74 and draw the core 58 forwardly and rotate the ratchet wheel 40 through an appreciable distance before the pin 72 reaches the forward end of the hole 70. When that occurs, the slide member 68 is moved forwardly away from the spring arm 67, thereby allowing the spring arm to open the contact 66 of switch S–1. It is therefore apparent from the foregoing description that when the solenoid 56 is de-energized, the core member will be moved rearwardly by the leaf spring 74 to its beginning position, thereby also moving the pawl 62 rearwardly to disengage itself from the outer portion of the ratchet wheel 40 and to re-engage the ratchet wheel at a new location thereon. Any backward rotation of the ratchet wheel 40 is prevented by the check pawl 46, as previously described.

The invention also provides for an alternate drive means which includes an electric motor for rotating the ratchet wheel 40. In such alternate embodiment operation of the external switch S–4 energizes the motor to turn the ratchet wheel and move the control arm from one position to the other.

Referring to FIGS. 7 and 8, circuit means are provided for energizing the solenoid 56. In this regard, a power source such as a battery 76 (FIG. 8) is connected through a first terminal such as 78 and through the normally closed switch S–1 to the solenoid. The path back to the battery can go two different ways: one through normally closed switch S–2, a second terminal such as 80, and through an external switch S–4 back to the battery; the other through normally closed switch S–3, a third terminal such as 82, and through external switch S–4 back to the battery. In the preferred form of the invention, the battery 76 and the external switch member S–4 are located outside of and remote from the housing 24, in which case terminals 78, 80 and 82 in FIG. 7 correspond to terminal boxes 1, 2, and 3, respectively, in FIG. 8. The positions of the switches in FIG. 8 correspond to the positions of the elements in FIGS. 3, 4, and 5, i.e., the control arm 20 is in the first position.

When it is desirable to move the control arm 20 from its first position to its second position, external switch S–4 is operated to connect the battery 76 with the line passing through the third terminal 82. Since switch S–3 is already closed, as is switch S–1, there is a closed loop from one terminal of the battery 76 to the other which passes through the solenoid 56. The magnetic field created by the energized solenoid 56 serves to draw the core 58 forwardly, which linear motion is converted to rotary motion of the ratchet wheel 40 by the forward movement of the pawl 62. When the forward movement of the core 58 brings the pin 72 to the forward end of the oblong hole 70, the slide member 68 is also drawn forwardly to momentarily open the switch S–1. When switch S–1 is opened, the solenoid 56 is immediately de-energized. The leaf spring 74 moves the core 58 back to its beginning position, which rearward movement also recloses switch S–1 in the manner previously indicated. The solenoid 56 is therefore immediately re-energized and the same process begins again.

It will be appreciated from the foregoing that the solenoid 56 is energized in a pulsating manner, which pulsations are transmitted through the core 58 and the pawl 62 to the ratchet wheel 40. Such pulsations enable intermittent linear motion to be converted to intermittent rotary motion. The power that is transmitted from the solenoid 56 to the ratchet wheel 40 is further transferred through the cam 30 to the control arm 20, thereby causing the control arm to pivot from its first position to its second position. The tension of the springs 32 is designed to provide additional pivoting force to the control arm during the last 90° of rotation of the ratchet wheel 40. As soon as the ratchet wheel 40 has rotated 180° and moved the control arm from its first position to its second position, the switch dog 54 engages the movable contact 50' of switch S–3, thereby opening switch S–3 and terminating the pulsating power generation and transfer previously described.

Each of the respective combinations of switch dog 52 with switch S–2 and switch dog 54 with switch S–3 acts as stop means connecting the ratchet wheel 40 with the circuit means, to de-energize the magnetic means whenever rotation of the ratchet wheel causes the control arm 20 to be in its first or second position.

It will be appreciated from all the foregoing that the invention provides control apparatus including electromechanical means which is coupled with an activating arm of an adjacent circuit breaker unit or any other adjacent electrical switch having an activating arm. Since the electromechanical means includes an external switch member such as S–4 as previously described, the activating arm being controlled can be moved from an "off" position to an "on" position or vice versa by remote operation of the external switch member.

Although an exemplary embodiment of the invention has been disclosed herein for purposes of illustration, it will be understood that various changes, modifications, and substitutions may be incorporated in such embodiment without departing from the spirit of the invention as defined by the claims which follow.

I claim:
1. Control apparatus for an electrical switch having an activating arm including:
 a housing;
 a control arm pivotally mounted in said housing for movement between a first position and a second position;
 rigid means for directly connecting said control arm with the activating arm of the electrical switch for simultaneous movement of said arms;
 a cam in said housing attached to said control arm;
 a control wheel rotatably mounted in said housing and directly and continuously engaging said cam;
 drive means for rotating said control wheel to actuate said cam and move the control arm from its first position to its second position and from its second position to its first position;
 circuit means for energizing said drive means to cause rotation of said control wheel, including an external switch member remote from said housing; and
 stop means connecting said control wheel with said circuit means for de-energizing said drive means whenever rotation of said control wheel causes the control arm to move to its second position and to move to its first position, whereby operation of said external switch member moves the activating arm of the electrical switch in synchronism with said control arm as said control arm is moved from one of said positions to the other.

2. Control apparatus as in claim 1 in which said stop means includes a normally closed contact junction in said circuit means and a finger member extending from said control wheel and disposed thereon to engage and open said contact junction when said control wheel has rotated sufficiently to move the control arm to its second position.

3. Control apparatus as in claim 1 in which said cam includes an elongated slot and said control wheel includes an actuating pin extending therefrom and adapted to fit in the elongated slot.

4. Control apparatus as in claim 1 in which said drive means includes means for rotating said control wheel to actuate said cam and move said control arm from its second position to its first position, and in which said stop means includes means connecting said control wheel with said circuit means for de-energizing said drive means whenever rotation of said control wheel causes said control arm to be in its first position, whereby operation of said external switch member moves the activating arm to a position corresponding to said first position of said control arm.

5. Control apparatus as in claim 1 in which said drive means includes a solenoid member and a core member, one of which is fixed by being attached to said housing and the other of which is movable and coupled to said control wheel, whereby operation of said external switch member moves said movable member of said drive means in a forward direction causing rotation of said control wheel.

6. Control apparatus for an electrical switch having an activating arm including:
a housing;
a control arm pivotally mounted in said housing for movement between a first position and a second position;
rigid means for connecting said control arm with the activating arm of the electrical switch;
a cam in said housing attached to said control arm;
a control wheel rotatably mounted in said housing and engaging said cam and including a ratchet wheel;
drive means for rotating said control wheel to actuate said cam and move the control arm from its first position to its second position, said drive means including a solenoid member and a core member, one of which is fixed by being attached to said housing and the other of which is movable and coupled to said control wheel;
circuit means for energizing said drive means to cause rotation of said control wheel, including an external switch member remote from said housing;
stop means connecting said control wheel with said circuit means for de-energizing said drive means whenever rotation of said control wheel causes the control arm to be in its second position, whereby operation of said external switch member moves the activating arm to a position corresponding to said second position of said control arm;
with said drive means including a pawl member connected with said movable wheel for rotating said ratchet wheel upon operation of said external switch member moving said movable member of said drive means in a forward direction causing rotation of said control wheel.

7. Control apparatus as in claim 6 in which said drive means includes cut-off means for intermittently de-energizing said drive means during rotation of said ratchet wheel, said cut-off means including an arm of a normally closed switch in said circuit means and a slide member connecting said switch arm to said movable member of said drive means, whereby the resulting intermittent movement of said movable member of said drive means in a backward direction allows said pawl member to repeatedly disengage said ratchet wheel and re-engage it at a different location on its perimeter.

8. Control apparatus as in claim 7 in which said drive means includes a check pawl engageable with said ratchet wheel for restricting rotation of said ratchet wheel to one direction only.

9. Control apparatus for an electrical switch having an activating arm including:
a housing;
a control arm pivotally mounted in said housing for movement between a first position and a second position;
rigid means for connecting said control arm with the activating arm of the electrical switch;
a cam in said housing attached to said control arm and including an elongated slot;
a ratchet wheel rotatably mounted in said housing and having an actuating pin extending therefrom which is adapted to fit in the elongated slot of said cam;
a fixed solenoid member attached to said housing;
a movable core member adapted to fit within said solenoid member;
a pawl member connecting said movable core member to said ratchet wheel;
circuit means for energizing said solenoid member to move said core member thereby causing rotation of said ratchet wheel, said circuit means including an external switch member remote from said housing;
cut-off means for intermittently de-energizing said solenoid member during rotation of said ratchet wheel to allow said pawl member to repeatedly disengage said ratchet wheel and re-engage it at a different location on its perimeter; and
stop means connecting said ratchet wheel with said circuit means for de-energizing said solenoid member whenever rotation of said ratchet wheel causes said control arm to be in the first position and whenever rotation of said ratchet wheel causes said control arm to be in the second position, whereby operation of said external switch member causes said control arm to move from one of said positions to the other and causes corresponding movement of the activating arm of the electrical switch.

10. Control apparatus as in claim 9 in which said cut-off means includes an arm of a normally closed switch in said circuit means and a slide member connecting said switch arm to said movable core member in which said apparatus further includes a check pawl engageable with said ratchet wheel for restricting rotation of said ratchet wheel to one direction only.

11. An apparatus for opening and closing an electrical circuit including:
an electrical distribution box;
a plurality of holding means in said box, each adapted for removably mounting a circuit breaker unit;
a circuit breaker unit mounted in one of said holding means, and having an activating arm on a switch connected in series with the electrical circuit; and
control apparatus having the configuration of said circuit breaker unit and removably mounted in any of said holding means, said control apparatus being mounted in one of said holding means adjacent said circuit breaker unit and including electromechanical means for coupling with said activating arm of said adjacent circuit breaker unit, said electromechanical means having an external switch member, whereby operation of said external switch member causes the electrical circuit to open and to close.

12. Apparatus as in claim 11 in which said control apparatus includes a housing removably mounted in any of said holding means, and said electromechanical means includes:
a control arm pivotally mounted in said housing for movement between a first position and a second position;
rigid means for connecting said control arm with said activating arm of said adjacent circuit breaker unit;
a cam in said housing attached to said control arm;
a control wheel rotatably mounted in said housing and engaging said cam;

drive means for rotating said control wheel to actuate said cam and move the control arm from its first position to its second position, said drive means including magnetic means coupled to said control wheel;

circuit means for energizing said magnetic means to cause rotation of said control wheel, said circuit means including said external switch member; and stop means connecting said control wheel with said circuit means for de-energizing said magnetic means whenever rotation of said control wheel causes the control arm to be in its second position, whereby operation of said external switch member moves the activating arm to a position corresponding to said second position of said control arm.

13. Apparatus as in claim 12 in which said drive means includes means for rotating said control wheel to actuate said cam and move the control arm from its second position to its first position, and in which said stop means includes means connecting said control wheel with said circuit means for de-energizing said magnetic means whenever rotation of said control wheel causes the control arm to be in its first position, whereby operation of said external switch member moves the activating arm to a position corresponding to said first position of said control arm.

References Cited

UNITED STATES PATENTS

| | | | |
|---|---|---|---|
| 3,213,236 | 10/1965 | Pendy | 335—74 |
| 3,332,044 | 7/1967 | Camp | 335—73 |
| 3,332,043 | 7/1967 | Camp | 335—73 |

GEORGE HARRIS, Primary Examiner

H. BROOME, Assistant Examiner